(12) United States Patent
Choi et al.

(10) Patent No.: US 11,465,333 B2
(45) Date of Patent: Oct. 11, 2022

(54) FILM PEELING DEVICE AND METHOD OF PEELING FILM

(71) Applicant: Samsung Display Co., LTD., Yongin-si (KR)

(72) Inventors: Myunggil Choi, Yongin-si (KR); Hee Soo Han, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/360,628

(22) Filed: Jun. 28, 2021

(65) Prior Publication Data
US 2022/0134634 A1 May 5, 2022

(30) Foreign Application Priority Data
Nov. 5, 2020 (KR) .................. 10-2020-0146610

(51) Int. Cl.
*B32B 43/00* (2006.01)
*B29C 63/00* (2006.01)
*B32B 38/10* (2006.01)

(52) U.S. Cl.
CPC .......... *B29C 63/0013* (2013.01); *B32B 38/10* (2013.01); *B32B 43/006* (2013.01); *Y10T 156/1132* (2015.01); *Y10T 156/1168* (2015.01); *Y10T 156/1944* (2015.01); *Y10T 156/1978* (2015.01)

(58) Field of Classification Search
CPC ............. B32B 43/006; Y10T 156/1132; Y10T 156/1168; Y10T 156/1944; Y10T 156/1978
See application file for complete search history.

(56) References Cited

U.S. PATENT DOCUMENTS

| | | | |
|---|---|---|---|
| 6,503,130 B2* | 1/2003 | Lim | B24B 37/34 |
| | | | 156/716 |
| 9,511,578 B2* | 12/2016 | Lv | B32B 43/006 |
| 9,902,584 B2* | 2/2018 | Kramer | B65H 20/16 |
| 9,922,862 B2* | 3/2018 | Fehkuhrer | H01L 21/68728 |
| 10,283,387 B2* | 5/2019 | Fukushi | B32B 38/10 |
| 10,781,091 B2* | 9/2020 | Procyshyn | B65B 69/00 |
| 2014/0174041 A1* | 6/2014 | Monti | B65B 69/0033 |
| | | | 53/492 |
| 2017/0326865 A1* | 11/2017 | Ayabe | B32B 43/006 |
| 2017/0334187 A1* | 11/2017 | Kumakura | H01L 51/56 |
| 2021/0039304 A1* | 2/2021 | Han | B65H 29/54 |

FOREIGN PATENT DOCUMENTS

| | | |
|---|---|---|
| KR | 10-1119571 | 3/2012 |
| KR | 10-1566956 | 11/2015 |
| KR | 10-1593567 | 2/2016 |
| KR | 10-1765297 | 8/2017 |
| KR | 10-2017-0103056 | 9/2017 |

* cited by examiner

Primary Examiner — Philip C Tucker
Assistant Examiner — Nickolas R Harm
(74) Attorney, Agent, or Firm — Kile Park Reed & Houtteman PLLC

(57) ABSTRACT

A film peeling device includes a chamber, a lower stage disposed on a first wall of the chamber, first to fourth grippers capable of peeling first to fourth sides of a film by gripping the first to fourth sides of the film attached to an object disposed on the lower stage and an upper stage disposed on a second wall of the chamber facing the first wall of the chamber and capable of extending in a first direction in which the object is disposed.

10 Claims, 14 Drawing Sheets

FILM PEELING DEVICE AND METHOD OF PEELING FILM

CROSS-REFERENCE TO RELATED APPLICATION(S)

This application claims priority to and the benefit of Korean Patent Application No. 10-2020-0146610, filed in the Korean Intellectual Property Office (KIPO) on Nov. 5, 2020, the entire contents of which is incorporated herein by reference.

BACKGROUND

1. Technical Field

Embodiments of the disclosure relate generally to a film peeling device and a method of peeling film, and more specifically, to a film peeling device capable of simultaneously peeling four sides of a film and a method of peeling film using the film peeling device.

2. Description of the Related Art

During a manufacturing process of a display device, the display device may be transported with a protective film attached to the display device in order to protect each component. At this time, the protective film must be removed in order to bond the each component together. When removing the protective film, the components should not be damaged without the surrounding foreign matters coming into contact with them.

Recently, the display device has been produced to have a shape curved at an edge of the corner. Through this, the display device may display an image even at the corner. The display device may have a quadrangular shape, and all four surfaces of the quadrangular shape may have a curved shape. Accordingly, each of the components (e.g., a window, a display panel, etc.) of the display device may also have a curved shape on all four sides.

In this case, the protective film attached to each components must be peeled at a time to precisely peel the protective film Therefore, research is being conducted to simultaneously peel the four surfaces of the protective film

SUMMARY

Embodiments provide a film peeling device capable of simultaneously peeling four sides of a film.

Embodiments provide a method of peeling film using a film peeling device capable of simultaneously peeling four sides of a film.

Additional features of the inventive concepts will be set forth in the description which follows, and in part will be apparent from the description, or may be learned by practice of the inventive concepts.

In an embodiment of a film peeling device may include a chamber, a lower stage disposed on a first wall of the chamber, first to fourth grippers capable of peeling first to fourth sides of a film by gripping the first to fourth sides of the film attached to an object disposed on the lower stage and an upper stage disposed on a second wall of the chamber facing the first wall of the chamber and capable of extending in a first direction in which the object is disposed.

In an embodiment, the first to fourth grippers may be disposed on the first wall of the chamber.

In an embodiment, the first to fourth grippers may be respectively disposed on first to fourth sidewalls perpendicular to the first wall of the chamber.

In an embodiment, the upper stage may include a support part disposed on the second wall of the chamber, an extension part at least partially disposed inside the support part, and movable in the first direction and an adsorption part disposed at an end of the extension part in the first direction and capable of adsorbing the object.

In an embodiment, the film peeling device may further include a transport part disposed between the second wall of the chamber and the upper stage. The transport part may transport the upper stage in a second direction perpendicular to the first direction.

In an embodiment, an alignment mark may be displayed on a surface of the lower stage contacting the object.

In an embodiment, the film peeling device may further include a plurality of connection elements disposed between the first wall of the chamber and the lower stage, and extending in a second direction opposite to the first direction so that the upper stage adsorbs the object.

In an embodiment, each of the plurality of connection elements may include a support part disposed on the first wall of the chamber and an extension part at least partially disposed inside the support part and movable in the second direction.

In an embodiment, the first to fourth grippers may be movable in the first direction.

In an embodiment, the first to fourth grippers may be movable in a direction between the first direction and a direction perpendicular to the first direction.

In an embodiment of a method of peeling film may include arranging an object on a lower stage disposed on a first wall of a chamber positioned in a first direction of the chamber, gripping first to fourth sides of a film attached to the object by using first to fourth grippers disposed inside the chamber and peeling the first to fourth sides of the film attached to the object by moving the first to fourth grippers.

In an embodiment, an upper stage may be disposed on a second wall of the chamber facing the first wall of the chamber. The upper stage may include a support part disposed on the second wall of the chamber, an extension part at least partially disposed inside the support part, and movable in the first direction and an adsorption part disposed at an end of the extension part in the first direction and capable of adsorbing the object.

In an embodiment, the method may further include, after the peeling of the first to fourth sides of the object, adsorbing the object by moving the extension part of the upper stage in the first direction and separating the object from the film by moving the extension part in a second direction opposite to the first direction.

In an embodiment, the separating of the object may include tilting the upper stage to separate only a portion of the film from the object.

In an embodiment, the method may further include, after the separating of the object, transporting the upper stage and the object together with a transport part disposed between the second wall of the chamber and the upper stage.

In an embodiment, the peeling of the first to fourth sides of the film may include moving the first to fourth grippers in the first direction to peel the film attached to the object.

In an embodiment, the peeling of the first to fourth sides of the film may include moving the first to fourth grippers in a direction between the first direction and in a direction perpendicular to the first direction to peel the film attached to the object.

In an embodiment, a plurality of connection elements may be disposed between the first wall of the chamber and the lower stage. Each of the plurality of connection elements may include a support part disposed on the first wall of the chamber and an extension part at least partially disposed inside the support part, and movable in a second direction opposite to the first direction.

In an embodiment, the method may further include, after peeling the first to fourth sides of the object, adsorbing the object by the upper stage by moving the extension part in the second direction and separating the film from the object by moving the extension part in the first direction.

In an embodiment, the separating of the object may include tilting the upper stage to separate only a portion of the film from the object.

Accordingly, the film peeling device may peel the first to fourth sides of the film attached to the object.

For example, the first pixel electrode may be connected to the drain electrode without forming a contact hole. Accordingly, it is possible to prevent a decrease in the flatness of the via insulating layer that occurs when the contact hole is formed. Accordingly, the luminous efficiency of the flexible display device may be improved.

BRIEF DESCRIPTION OF THE DRAWINGS

The above and other features and advantages of the disclosure will become more apparent by describing in detailed example embodiments thereof with reference to the accompanying drawings.

DETAILED DESCRIPTION OF THE EMBODIMENTS

Hereinafter, the disclosure will be explained in detail with reference to the accompanying drawings.

Figure 1:
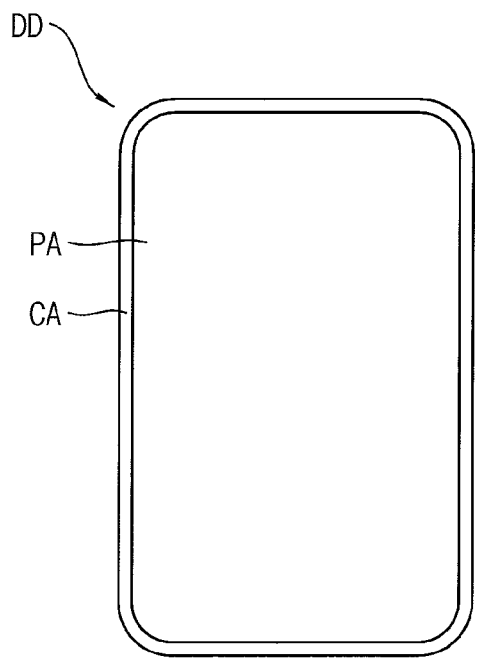
FIGS. 1 and 2 are schematic views illustrating a display device according to an embodiment.
Figure 2:
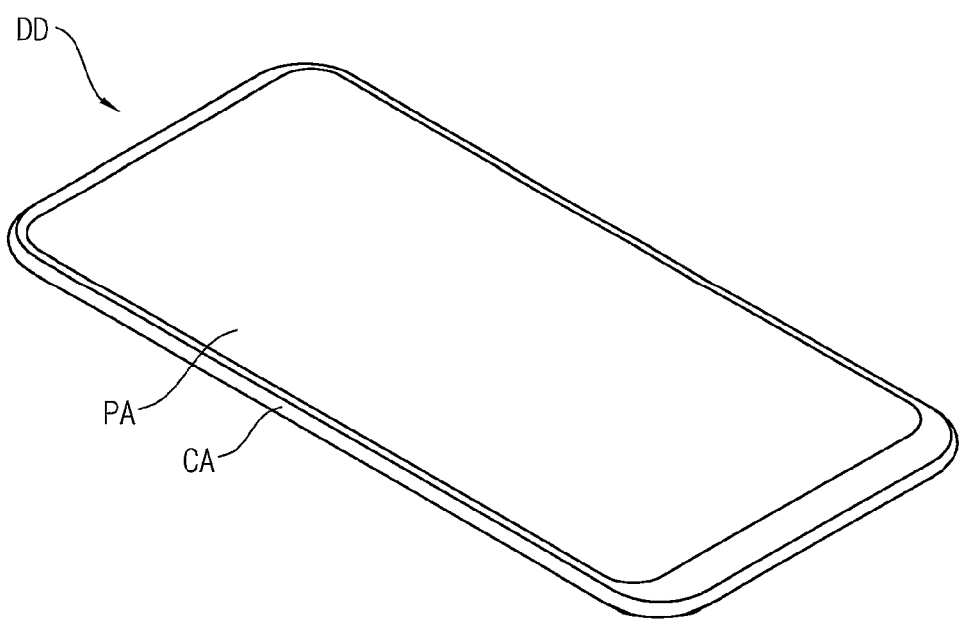

FIGS. 1 and 2 are schematic views illustrating a display device according to an embodiment.

Referring to FIGS. 1 and 2, a display device DD may include a flat portion PA and a side portion CA. The display device DD may be manufactured in various forms. For example, the display device DD may be manufactured in a form in which the side portion CA is perpendicular to the flat portion PA. The side portion CA may be manufactured to have a curvature and protrude outward of the display device DD.

The flat portion PA may be located on an upper surface of the display device DD and a rear surface of the display device DD. Pixels may be disposed in the flat portion PA. The display device DD may display an image through the flat portion PA.

The side portion CA may be extended to the flat portion PA. The side portion CA may be disposed along an edge of the display device DD between the upper surface of the display device DD and the rear surface of the display device DD. In embodiments, the side portion CA may include first to fourth sides, and an image may be displayed on the first to fourth sides as well. To this end, pixels may also be disposed in the side portion CA.

The side portion CA may connect the upper surface of the display device DD and the rear surface of the display device DD. In embodiments, the side portion CA may have various forms. For example, an area of the upper surface of the display device DD may be smaller than that of the rear surface of the display device DD. The side portion CA may have a predetermined inclination and connect the upper surface of the display device DD to the rear surface of the display device DD. The side portion CA may have a curvature and connect the upper surface of the display device DD and the rear surface of the display device DD.

As another example, for example, an area of the upper surface of the display device DD and an area of the rear surface of the display device DD may be the same as an area of the rear surface of the display device DD and overlap each other. The side portion CA may be disposed perpendicular to the upper surface of the display device DD and the rear surface of the display device DD and may connect the upper surface of the display device DD with the rear surface of the display device DD. As another example, the side portion CA may connect the upper surface of the display device DD and the rear surface of the display device DD while a center of the side portion CA protrudes outside of the display device DD.

The display device DD may include various components therein. At least some of the components and the display device DD may have a same shape. For example, a window, a display panel, and the like and the display device DD may have a same shape. Accordingly, the window, the display panel, and the like may also include a flat portion and a side portion similar to the display device DD. A film (e.g., a protective film) may be attached to the window, the display panel, and the like. The film may protect the window, the display panel, and the like from external impacts in a process of manufacturing the display device DD. For example, the film may protect the window, the display panel, and the like from external scratches in a process of transporting the window and the display panel.

However, the film must be removed in a process of combining the window, the display panel, or the like. Accordingly, a film peeling device (or film stripping device) for removing the film from the window, the display panel, or the like and a method of peeling a film by using the film peeling device will be described.

Figure 3:
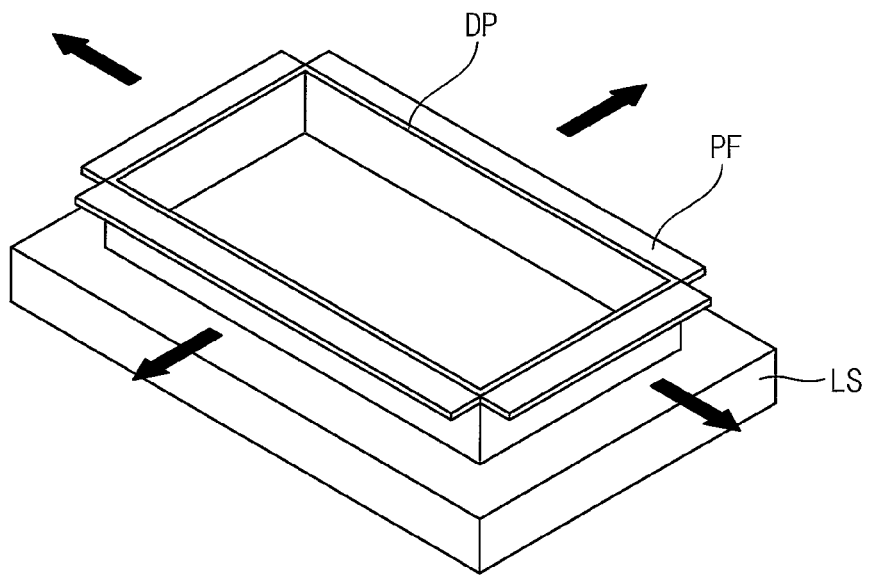
FIG. 3 is a schematic view illustrating a lower stage and a film according to an embodiment.
Figure 4:
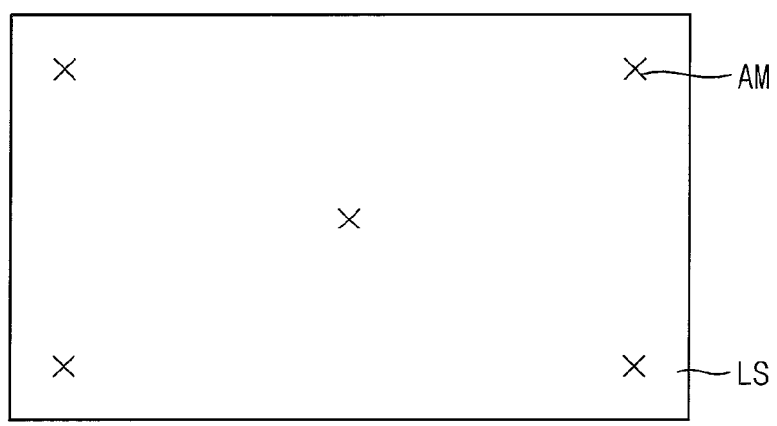
FIG. 4 is a schematic view illustrating an embodiment of an upper surface of the lower stage of FIG. 3.

FIG. 3 is a schematic view illustrating a lower stage and a film according to an embodiment, FIG. 4 is a schematic view illustrating an embodiment of an upper surface of the lower stage of FIG. 3, and FIGS. 5 to 10 are schematic view illustrating a method of peeling a film according to an embodiment.

Referring to FIGS. 3 to 10, the film peeling device may include a lower stage LS, an upper stage US, a transport part, and grippers GP. The upper stage US may include a support part SP1, an extension part EP1, and an adsorption part AP. The transport part may include a roller RO and a transport belt BE.

The lower stage LS may be disposed inside a chamber. For example, the lower stage LS may be disposed on a first wall positioned in a first direction DR1 of the chamber. An object DP to be removed to which a film PF is attached may be disposed on the lower stage LS. The object DP to be removed may include the above-described window, display panel, or the like. The film PF may refer to a protective film for protecting the window, the display panel, and the like from external impacts while they are transported.

On the lower stage LS, as illustrated in FIG. 4, an alignment mark AM may be displayed so that the object DP to be removed may be accurately positioned on the lower stage LS. Although it is illustrated that five alignment marks AM are displayed in FIG. 4, this is merely an example, and the alignment marks AM may be displayed in various ways as long as they assist in accurately positioning the object DP to be removed on the lower stage MS. For example, the alignment marks AM may be displayed only at corners of the upper surface of the lower stage LS. For example, four alignment marks AM may be displayed on the lower stage LS. As another example, the alignment marks AM may be displayed on each end of the upper surface of the lower stage LS. For example, two alignment marks AM may be displayed on the lower stage LS. The film peeling device may use a vision camera (not illustrated) to check whether the object DP to be removed is precisely positioned to correspond to the alignment marks AM. The film stripping device may adjust the position of the object DP to be removed in case that the object DP to be removed is not positioned to correspond to the alignment marks AM. After it is confirmed that the object DP to be removed corresponds to the alignment marks AM, the film peeling device may perform a film peeling process.

As illustrated in FIG. 3, first to fourth sides of the film PF may be peeled at the same time. For example, the first to fourth sides of the film PF may be simultaneously peeled from first to fourth sides of the object DP to be removed. An area where the first to fourth sides of the film PF contact each other may be cut to facilitate the peeling. Accordingly, the film peeling device may simultaneously peel the first to fourth sides of the film PF.

In embodiments, the grippers GP may grip a portion of the film PF. For example, the grippers GP may grip a protrusion of the film PF that protrudes outward of the object DP to be removed. Thereafter, a film peeling process may be performed by the grippers GP pulling a portion of the film PF.

In embodiments, the grippers GP may be disposed inside the chamber. For example, the grippers GP may be disposed on the first wall of the chamber. Alternatively, for example, the grippers GP may be disposed on first to fourth sidewalls perpendicular to the first wall of the chamber, respectively. The grippers GP may be disposed at various locations inside the chamber. For example, the grippers GP may be disposed on the lower stage LS or on a second wall opposite the first wall.

In embodiments, four grippers GP may be provided. Each of the four grippers GP may be disposed on the first to fourth sidewalls of the chamber. Each of the four grippers GP may grip the first to fourth sides of the film PF. The four grippers GP may simultaneously peel the film PF from the first to fourth sides of the object DP to be removed. In case that the four grippers GP separate the film PF from the first to fourth sides of the object DP to be removed at the same time, the film peeling device may not cause damage to the object to be removed DP. Therefore, the film PF may be readily removed.

In embodiments, the grippers GP may move in a direction between the first direction DR1 and a direction perpendicular to the first direction DR1, and away from the object DP to be removed to peel the film PF. For example, the grippers GP may perform a film peeling process while pulling the film PF in a diagonal direction. While a friction between the film PF and the first to fourth sides of the object DP to be removed may be reduced or minimized, the film PF may be peeled from the object DP to be removed. Therefore, it is possible to minimize the power required to peel the film PF from the first to fourth sides of the object DP to be removed.

As another example, in embodiments, the grippers GP may move in the first direction DR1 to peel the film PF. For example, the grippers GP may perform a film peeling process while pulling the film PF in a vertical direction.

Figure 5:
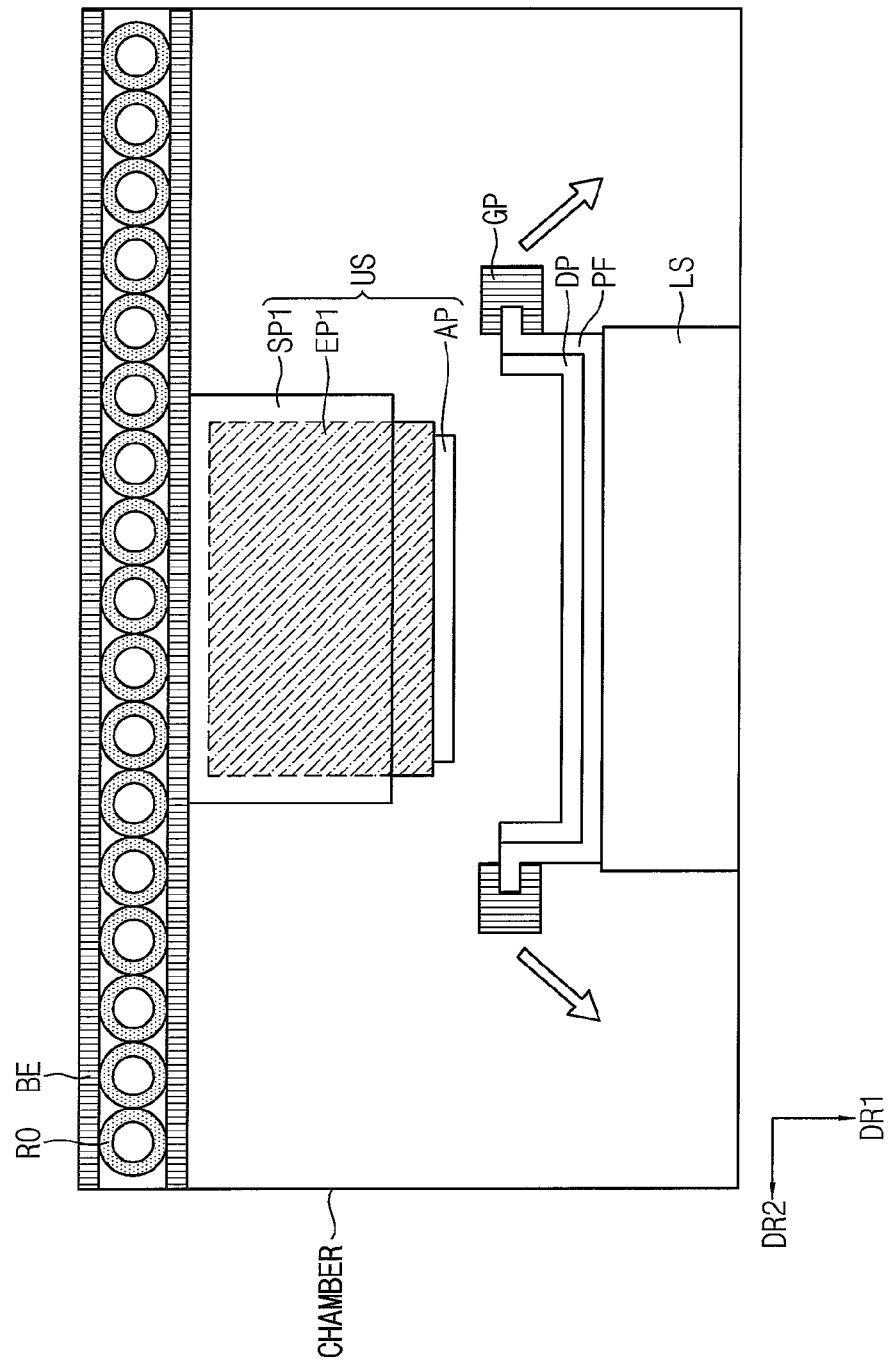
FIGS. 5 to 10 are schematic views illustrating a method of peeling film according to an embodiment.
Figure 6:
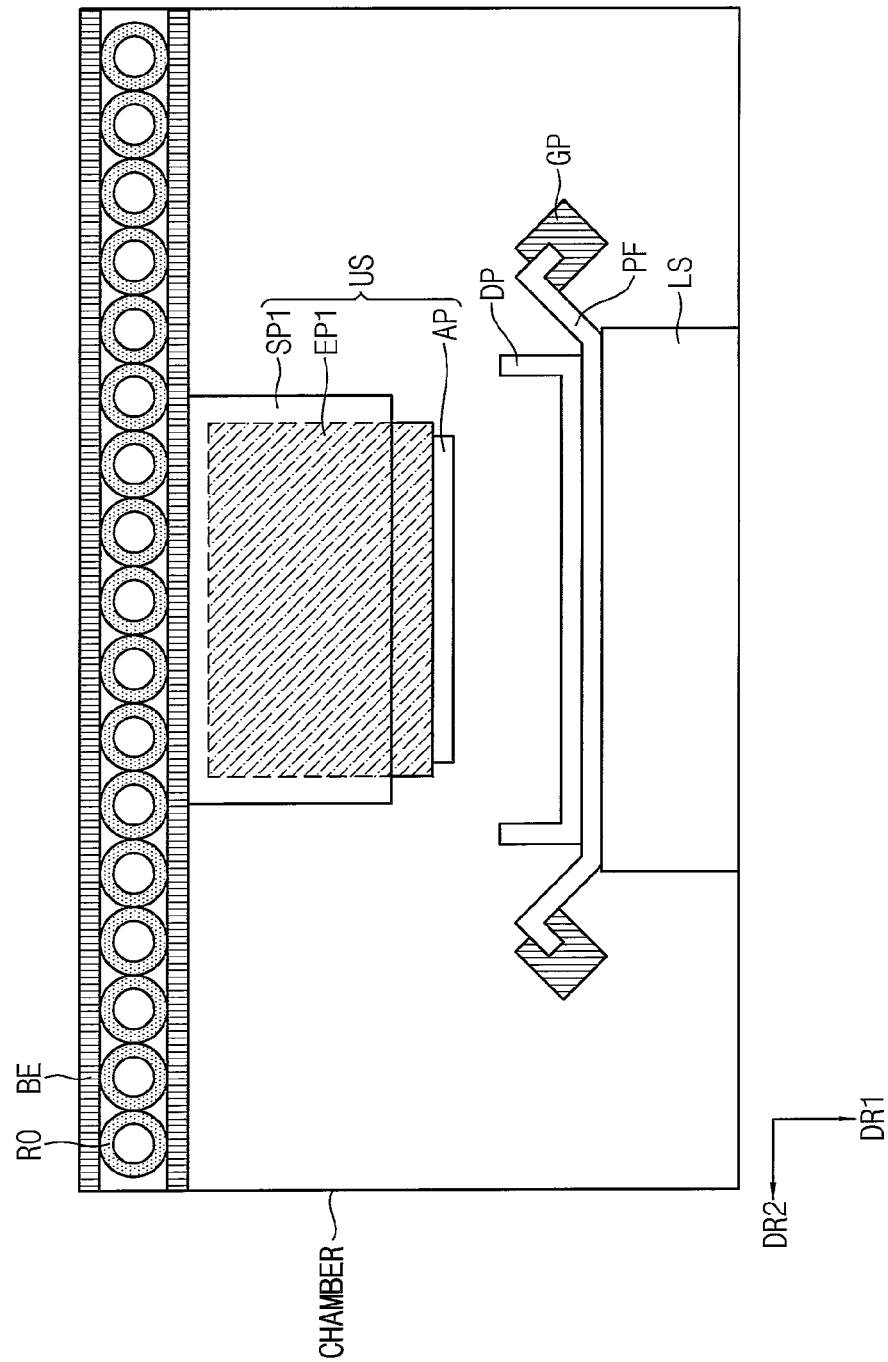
Figure 7:
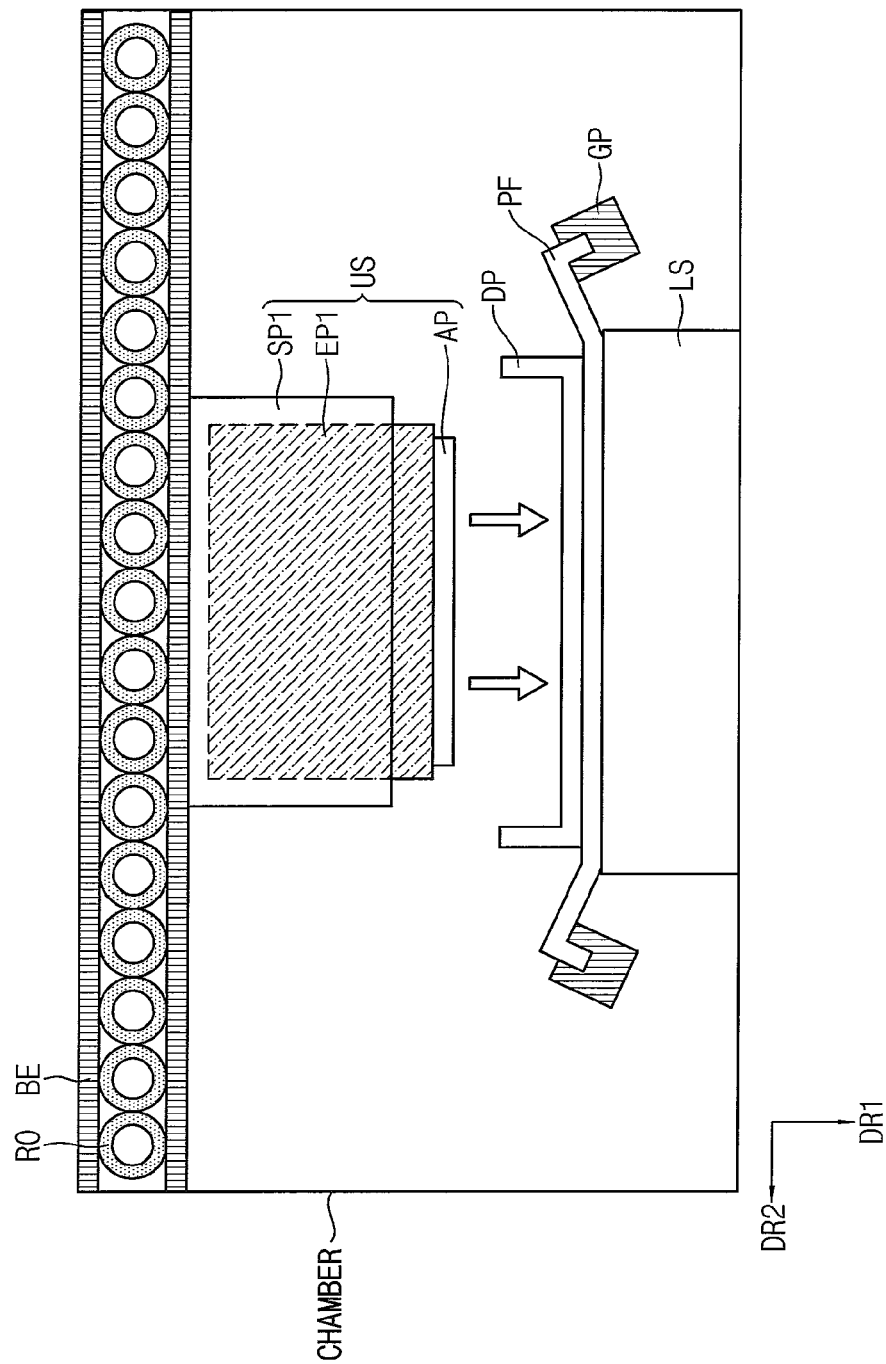

As illustrated in FIGS. 5 to 7, the grippers GP may grip a protrusion protruding outside of the film PF to peel the film PF from the object DP to be removed. The grippers GP may separate the film PF from the first to fourth sides of the object DP to be removed.

Figure 8:
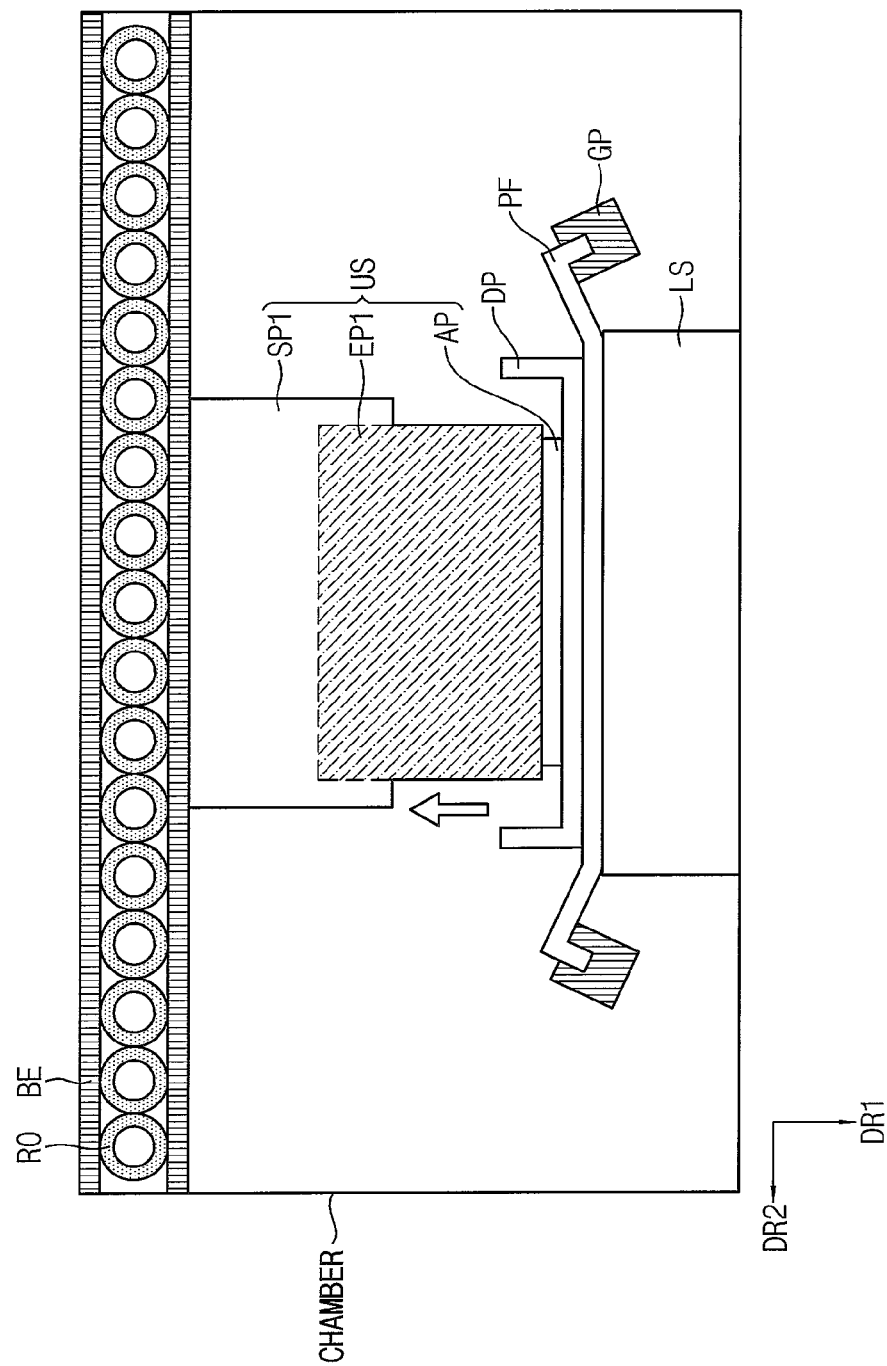

As illustrated in FIGS. 7 and 8, the upper stage US disposed on a second wall facing the first wall may adsorb the object DP to be removed. The upper stage US may extend in the first direction DR1 in which the lower stage LS is disposed.

In embodiments, the extension part EP1 may be disposed inside the support part SP1. To this end, the support part SP1 may have an empty space therein. In the empty space, the extension part EP1 may move in a direction opposite to the first direction DR1 and the first direction DR1. Through this, the upper stage US may extend in the first direction DR1. For example, in the upper stage US, the extension part EP1 may move in the first direction DR1 to adsorb the object DP to be removed. After the upper stage US adsorbs the object DP to be removed, the extension part EP1 may move in a direction opposite to the first direction DR1 to separate the object DP to be removed and the film PF. The adsorption part AP may adsorb the object DP to be removed. In embodiments, the adsorption part AP may adsorb the object DP to be removed by including an adsorbing material, or may adsorb the object DP to be removed by a vacuum adsorption method.

Figure 9:
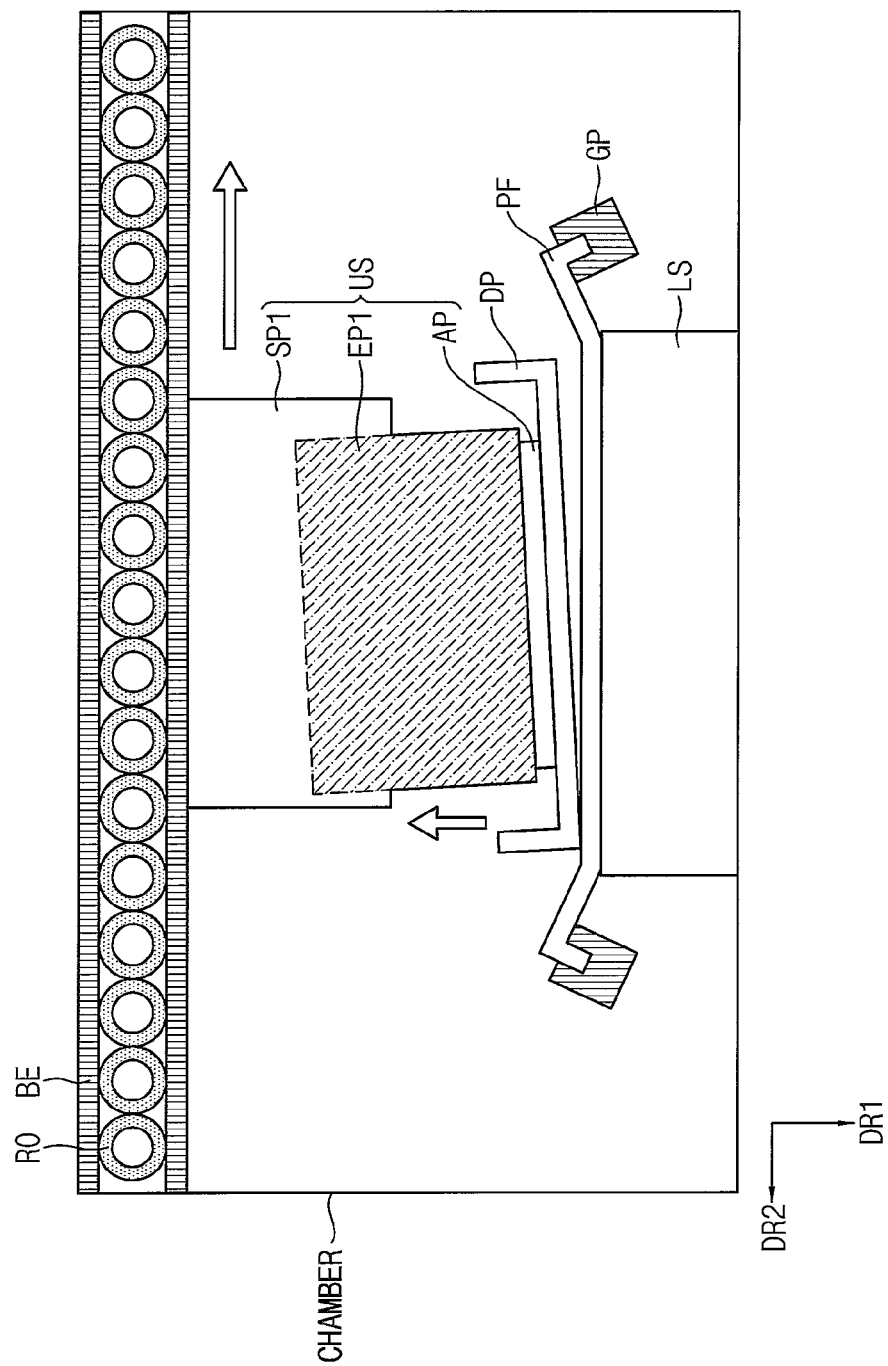

As illustrated in FIGS. 8 and 9, in embodiments, the upper stage US may adsorb the object DP to be removed through the adsorption part AP and may be tilted to separate a portion of the object DP to be removed from the film PF. For example, the upper stage US may be tilted by rotating the extension part EP1 at a predetermined angle with respect to a central axis.

In the upper stage US, only the extension part EP1 may tilt in a direction while the support part SP1 is fixed. Accordingly, the adhesion area between the object DP to be removed and the film PF may be reduced.

Thereafter, the upper stage US may separate the object DP to be removed from the film PF in the process of being transported in the second direction DR2 perpendicular to the first direction DR1 by the transport part.

FIGS. 8 and 9 illustrate that the object DP to be removed and the film PF are partially separated from each other in a direction opposite to the second direction DR2. However, this is merely an example, and the disclosure is not limited thereto. For example, the object DP to be removed and the film PF may be partially separated from each other in the second direction DR2.

Figure 10:
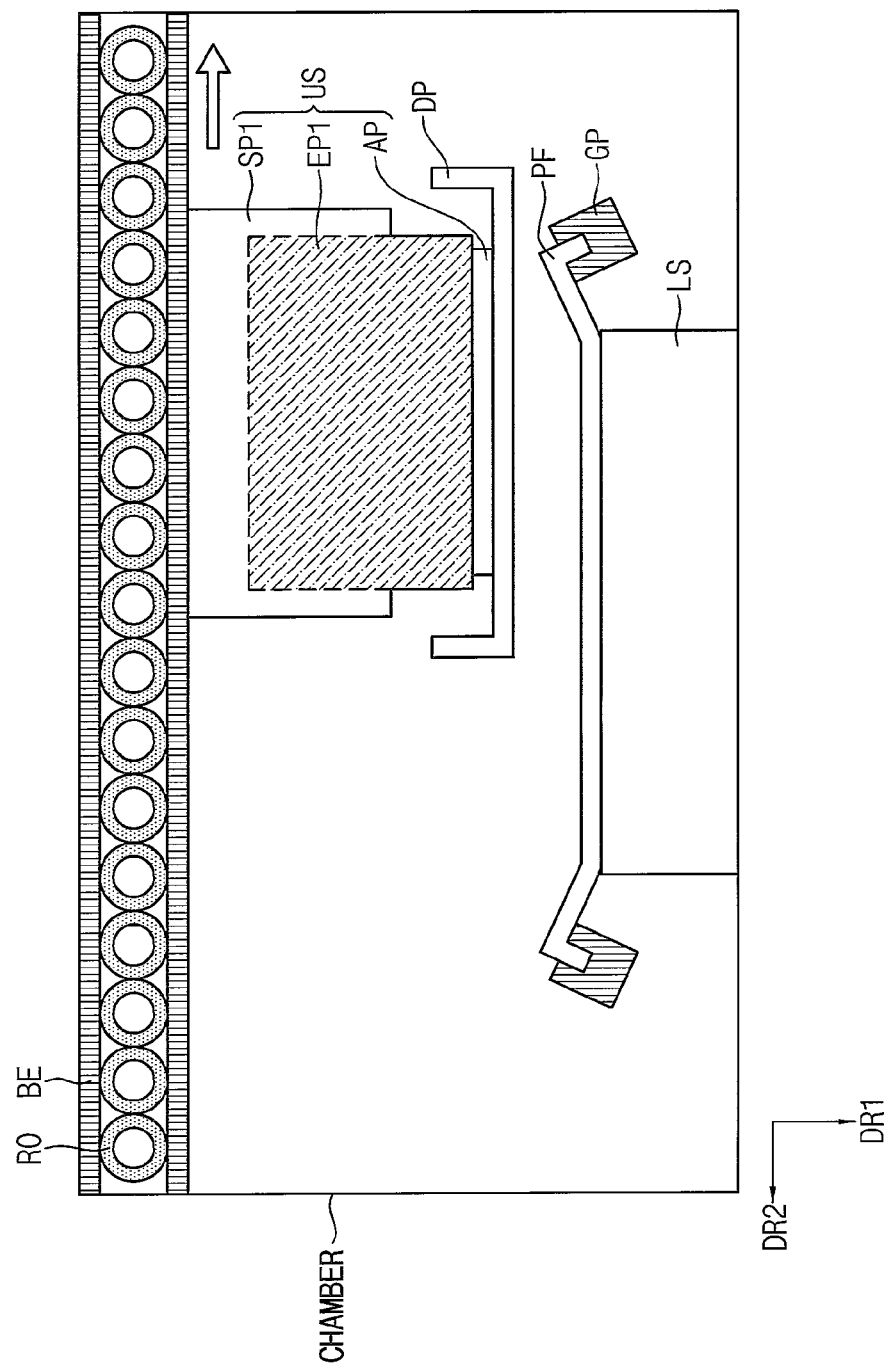

The transport part may be disposed between the chamber and the upper stage US. As illustrated in FIG. 10, after the upper stage US separates a portion of the object DP to be removed from the film PF, the transport part may transport the upper stage US and the object DP to be removed together in a direction perpendicular to the first direction DR1.

The film peeling device may include the chamber, the lower stage LS disposed on the first wall of the chamber, first to fourth grippers GP capable of simultaneously peeling the first to fourth sides of the film PF by gripping the first to fourth sides of the film PF attached to the object to be removed DP disposed on the lower stage LS, and the upper stage US disposed on the second wall facing the first wall of the chamber and capable of extending in the first direction DR1 in which the object DP to be removed is disposed. The film stripping device may simultaneously strip the first to fourth sides of the film PF attached to the object DP to be stripped.

Figure 11:
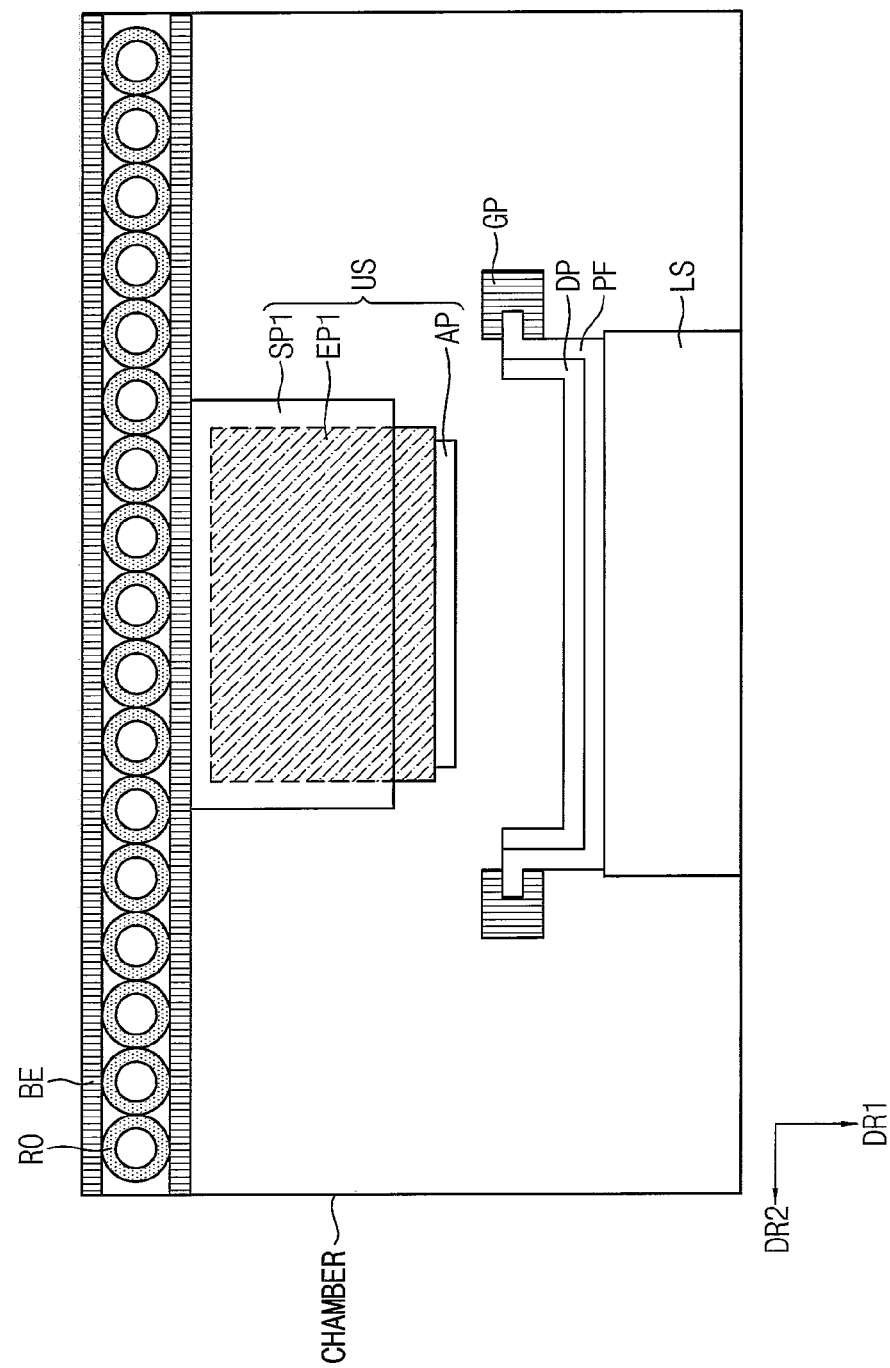
FIGS. 11 and 12 are schematic views illustrating a method of peeling film according to an embodiment.
Figure 12:
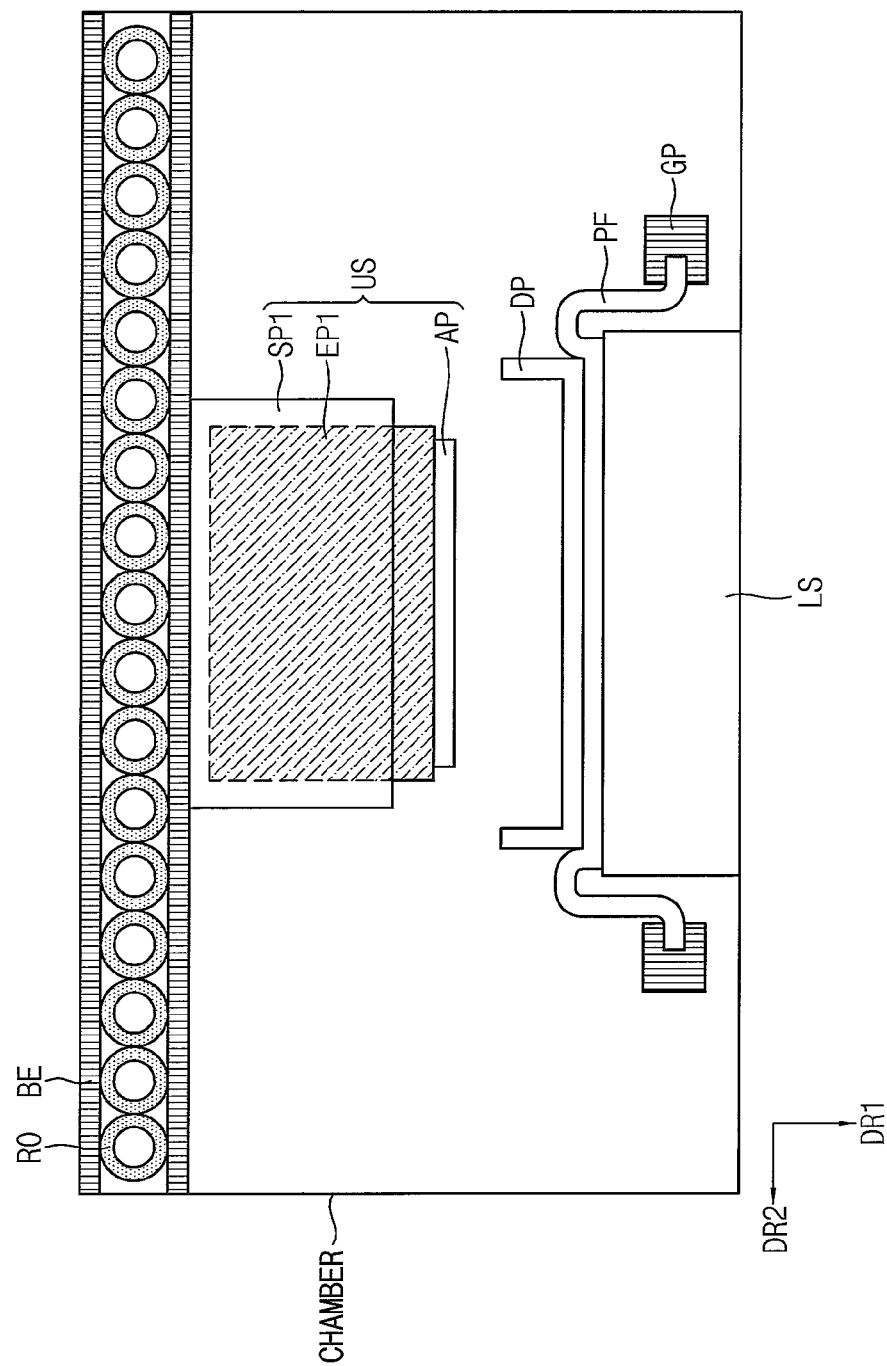

FIGS. 11 and 12 are schematic views each illustrating a method of peeling film according to an embodiment. FIGS. 11 and 12 may be substantially identical to those described above with reference to FIGS. 5 to 7 except that the grippers GP vertically move in the first direction DR1. Accordingly, descriptions of the repetitive configuration will be omitted.

Referring to FIGS. 11 and 12, the film peeling device may include a lower stage LS, an upper stage US, a transport part, and grippers GP. The upper stage US may include a support part SP1, an extension part EP1, and an adsorption part AP. The transport part may include a roller RO and a transport belt BE.

In embodiments, the grippers GP may grip a portion of the film PF. For example, the grippers GP may grip a protrusion of the film PF that protrudes outward of the object DP to be removed. Thereafter, a film peeling process may be performed by the grippers GP pulling the portion of the film PF.

In embodiments, the grippers GP may be disposed inside the chamber. For example, the grippers GP may be disposed on the first wall of the chamber. As another example, the grippers GP may be disposed on first to fourth sidewalls perpendicular to the first wall of the chamber, respectively. The grippers GP may be disposed at various locations inside the chamber. For example, the grippers GP may be disposed on the lower stage LS or on a second wall opposite the first wall.

In embodiments, four grippers GP may be provided. Each of the four grippers GP may be disposed on the first to fourth sidewalls of the chamber. Each of the four grippers GP may grip the first to fourth sides of the film PF. The four grippers GP may simultaneously peel the film PF from the first to fourth sides of the object DP to be removed. In case that the four grippers GP separate the film PF from the first to fourth sides of the object DP to be removed at the same time, the film peeling device may not cause damage to the object DP to be removed. Thus, the film PF may be readily removed. Since the four grippers GP simultaneously peel the film PF from the first to fourth sides of the object DP to be removed, the film peeling device may reduce the occurrence of foreign matter.

In embodiments, the grippers GP may move in the first direction DR1 to peel the film PF. For example, the grippers GP may perform a film peeling process while pulling the film PF in a vertical direction.

The film peeling device may peel the film PF from the first to fourth sides of the object to be removed DP while minimizing the moving distance of the grippers GP.

The film peeling device may include the chamber, the lower stage LS disposed on the first wall of the chamber, first to fourth grippers GP capable of simultaneously peeling the first to fourth sides of the film PF by gripping the first to fourth sides of the film PF attached to the object to be removed DP disposed on the lower stage LS, and the upper stage US disposed on the second wall facing the first wall of the chamber and capable of extending in the first direction DR1 in which the object DP to be removed is disposed. The film peeling device may simultaneously peel the first to fourth sides of the film PF attached to the object DP to be removed.

FIGS. 13 to 16 are schematic views illustrating a method of peeling a film according to an embodiment.

Referring to FIGS. 13 to 16, a film peeling device may include a lower stage LS, an upper stage US, a transport part, grippers GP, and a connection element. The connection element may include a support part SP2 and an extension part EP2. The upper stage US may include a support part SP1, an extension part EP1, and an adsorption part AP. The transport part may include a roller RO and a transport belt BE.

The lower stage LS may be disposed inside a chamber. For example, the lower stage LS may be disposed on a first wall positioned in a first direction DR1 of the chamber. An object DP to be removed to which the film PF is attached may be disposed on the lower stage LS. The object DP to be removed may include the above-described window, display panel, or the like. The film PF may refer to a protective film for protecting the window, the display panel, and the like.

The grippers GP may grip a portion of the film PF. Thereafter, a film peeling process may be performed while the grippers GP pull the portion of the film PF.

In embodiments, the grippers GP may be disposed inside the chamber. For example, the grippers GP may be disposed on the first wall of the chamber. As another example, the grippers GP may be disposed on first to fourth sidewalls perpendicular to the first wall of the chamber, respectively. The grippers GP may be disposed at various locations inside the chamber. For example, the grippers GP may be disposed on the lower stage LS or on a second wall opposite the first wall.

In embodiments, four grippers GP may be provided. Each of the four grippers GP may be disposed on the first to fourth sidewalls of the chamber. Each of the four grippers GP may grip the first to fourth sides of the film PF. The four grippers GP may simultaneously peel the film PF from the first to fourth sides of the object DP to be removed. In case that the four grippers GP separate the film PF from the first to fourth sides of the object DP to be removed at the same time, the film peeling device may not cause damage to the object DP to be removed. Thus, the film PF may be readily removed. In addition, since the four grippers GP simultaneously peel the film PF from the first to fourth sides of the object to be removed DP, the film peeling device may reduce the occurrence of foreign matter.

In embodiments, the grippers GP may move in a direction between the first direction DR1 and a direction perpendicular to the first direction DR1, and away from the object DP to be removed to peel the film PF. For example, the grippers GP may perform a film peeling process while pulling the film PF in a diagonal direction. While a friction between the film PF and the first to fourth sides of the object DP to be removed, the film PF may be peeled from the object DP to be removed. Through this, it is possible to minimize or reduce the power required to peel the film PF from the first to fourth sides of the object DP to be removed.

As another example, in embodiments, the grippers GP may move in the first direction DR1 to peel the film PF. For example, the grippers GP may perform a film peeling process while pulling the film PF in a vertical direction.

Figure 13:
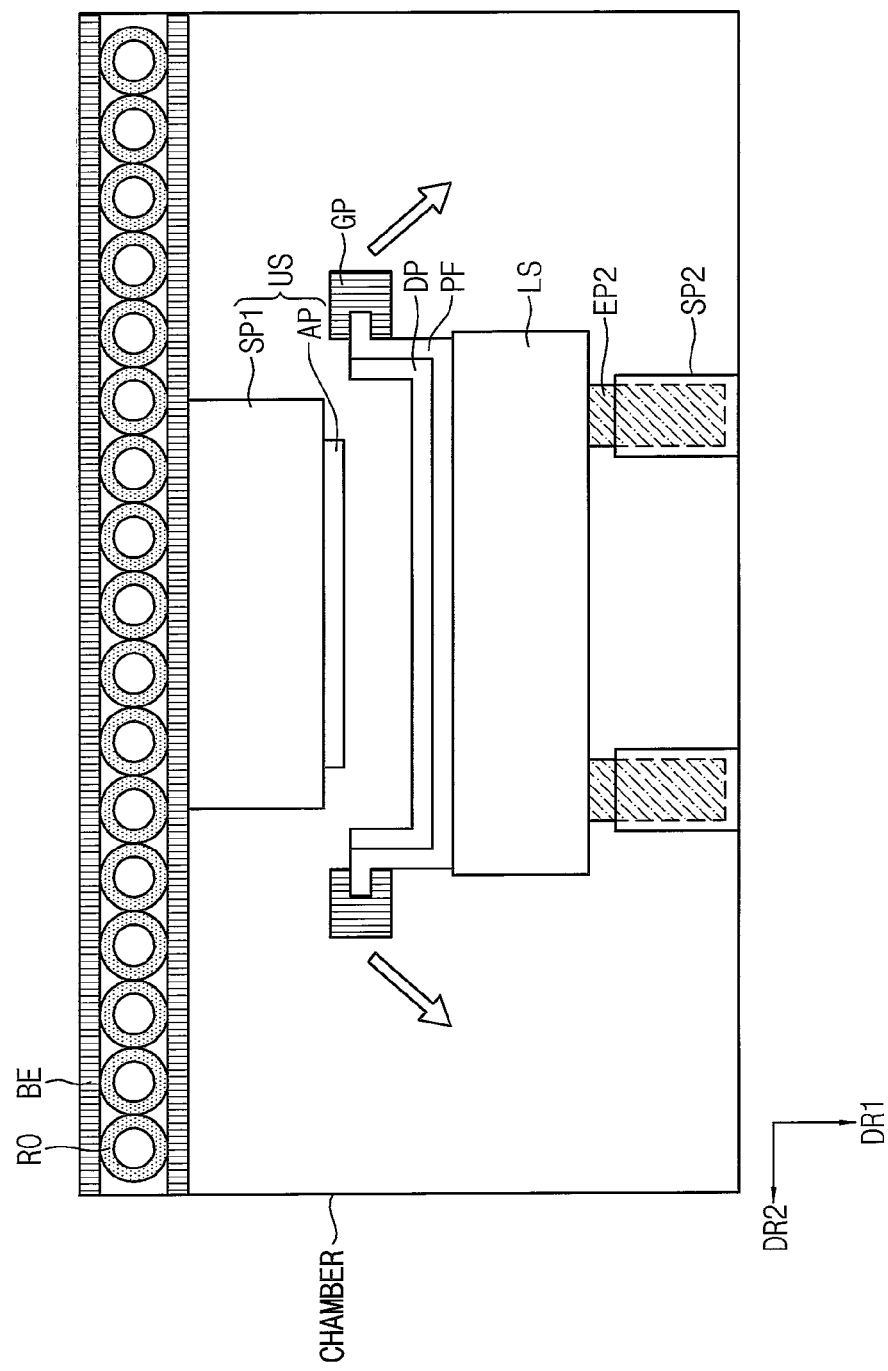
FIGS. 13 to 16 are schematic views illustrating a method of peeling film according to an embodiment.
Figure 14:
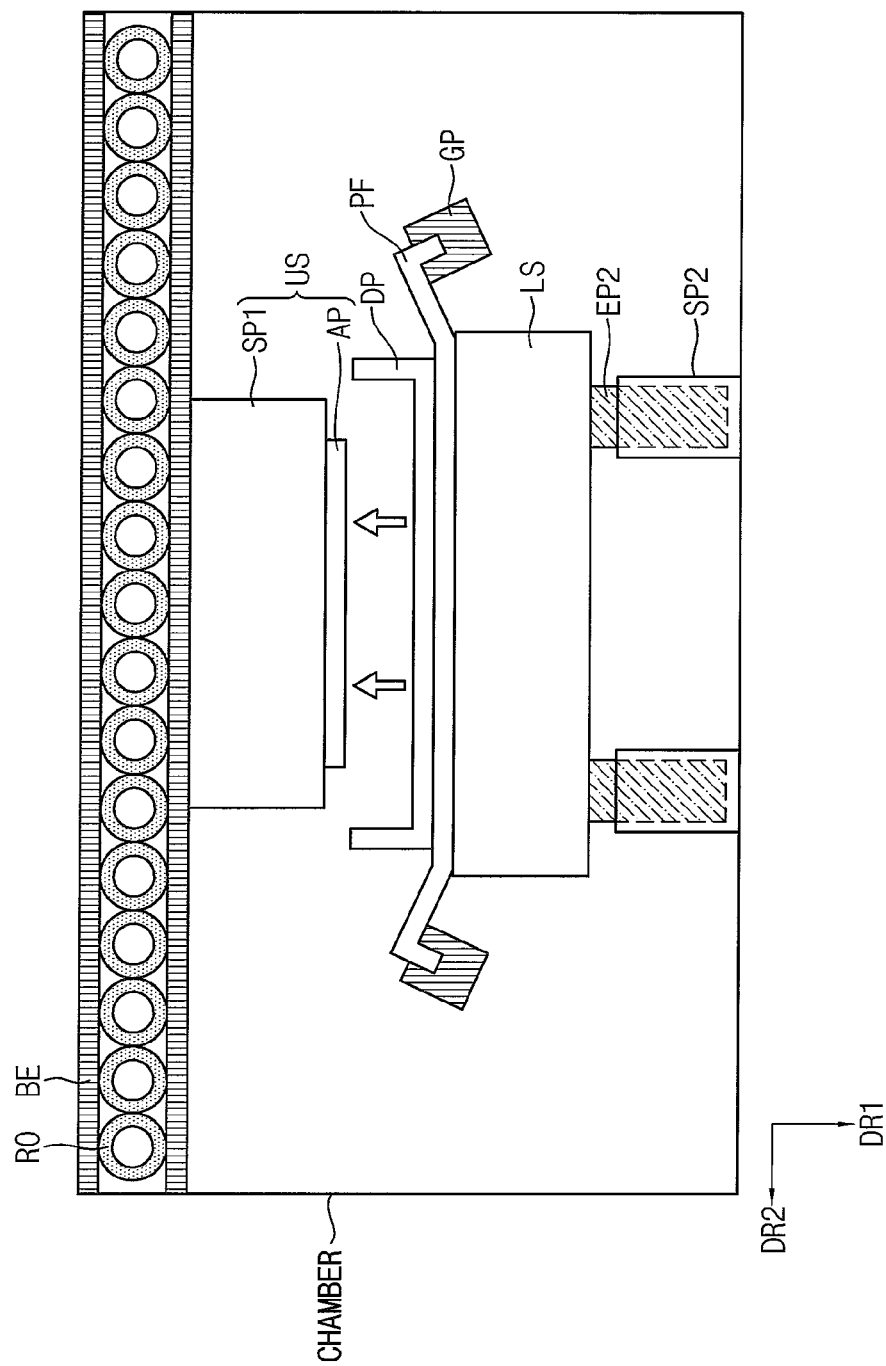
Figure 15:
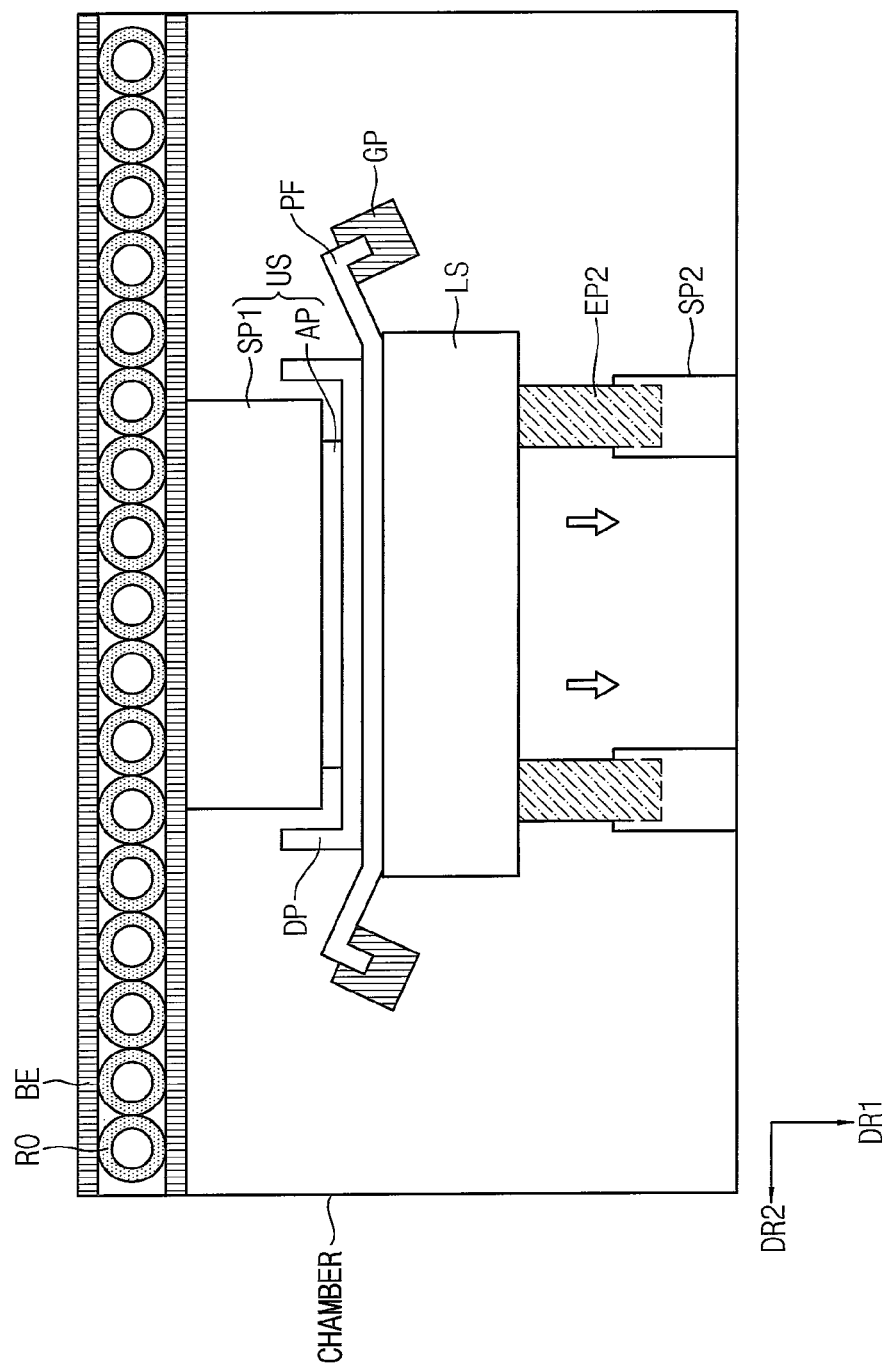
Figure 16:
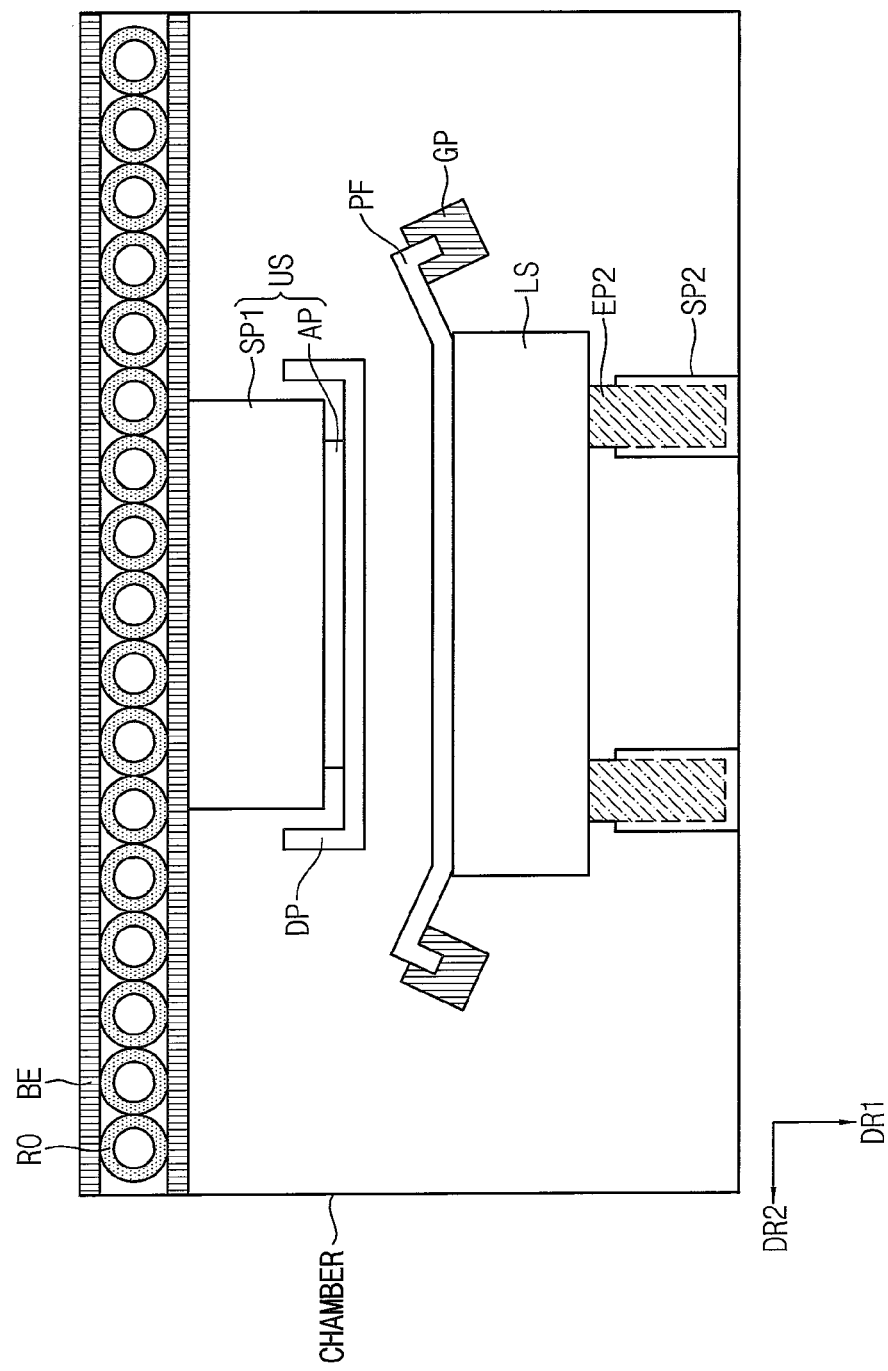

As illustrated in FIGS. 13 and 14, the grippers GP may peel the film PF from the first to fourth side surfaces of the object DP to be removed. Thereafter, as illustrated in FIGS. 14 and 15, the connection element may move the lower stage LS in a direction opposite to the first direction DR1 so that the upper stage US adsorb the object DP to be removed.

The connection element may be disposed between the lower stage LS and the first wall of the chamber. The connection element may support the lower stage LS and may move the lower stage LS in the first direction DR1. In embodiments, in the connection element, the extension part EP2 may be disposed inside the support part SP2. At least a portion of the extension part EP2 may be exposed to the outside of the support part SP2. The extension part EP2 may move in the first direction DR1 within the support part SP2. Through this, the connection element may move the lower stage LS in the first direction DR1.

The connection element may move the lower stage LS again in the first direction DR1 after the upper stage US adsorbs the object DP to be removed. Through this, the film peeling device may separate the film PF and the object DP to be removed.

As illustrated in FIG. 9, the upper stage US may adsorb the object DP to be removed DP by the adsorption part AP and may be tilted to separate a portion of the object DP to be removed from the film PF. In the upper stage US, only the extension part EP1 may tilt in a direction while the support part SP1 is fixed. Thereafter, the upper stage US may separate, from the film PF, another portion of the object DP to be removed in a direction opposite to the portion of the object DP to be removed in the process of being transported in a direction. Accordingly, the adhesion area between the object DP to be removed and the film PF may be reduced.

The foregoing is illustrative of the disclosure and is not to be construed as limiting thereof. Although a few example embodiments of the disclosure have been described, those skilled in the art will readily appreciate that many modifications are possible in the example embodiments without materially departing from the novel teachings and advantages of the disclosure. Accordingly, all such modifications are intended to be included within the scope of the disclosure as defined in the claims. In the claims, means-plus-function clauses are intended to cover the structures described herein as performing the recited function and not only structural equivalents but also equivalent structures. Therefore, it is to be understood that the foregoing is illustrative of the disclosure and is not to be construed as limited to the specific example embodiments disclosed, and that modifications to the disclosed example embodiments, as well as other example embodiments, are intended to be included within the scope of the appended claims. The disclosure is defined by the following claims, with equivalents of the claims to be included therein.

What is claimed is:

1. A method of peeling film comprising:
   arranging an object on a lower stage disposed on a first wall of a chamber positioned in a first direction of the chamber;
   gripping first to fourth sides of a film attached to the object by using first to fourth grippers disposed inside the chamber; and
   peeling the first to fourth sides of the film attached to the object by moving the first to fourth grippers.

2. The method of claim 1, wherein
   an upper stage is disposed on a second wall of the chamber facing the first wall of the chamber, and
   the upper stage includes:
   a support part disposed on the second wall of the chamber;
   an extension part at least partially disposed inside the support part; and
   an adsorption part disposed at an end of the extension part in the first direction.

3. The method of claim 2, further comprising, after the peeling of the first to fourth sides of the film:
   adsorbing the object by moving the extension part of the upper stage in the first direction; and
   separating the object from the film by moving the extension part in a second direction opposite to the first direction.

4. The method of claim 3, wherein the separating of the object includes:
   tilting the upper stage to separate only a portion of the film from the object.

5. The method of claim 3, further comprising, after the separating of the object:
   transporting the upper stage and the object together with a transport part disposed between the second wall of the chamber and the upper stage.

6. The method of claim 1, wherein the peeling of the first to fourth sides of the film includes moving the first to fourth grippers in the first direction to peel the film attached to the object.

7. The method of claim 1, wherein the peeling of the first to fourth sides of the film includes moving the first to fourth grippers in a direction between the first direction and a direction perpendicular to the first direction to peel the film attached to the object.

8. The method of claim 1, wherein
   a plurality of connection elements are disposed between the first wall of the chamber and the lower stage, and
   each of the plurality of connection elements includes:
   a support part disposed on the first wall of the chamber; and
   an extension part at least partially disposed inside the support part.

9. The method of claim 8, wherein
   an upper stage is disposed on a second will of the chamber facing the first wall of the chamber;
   the upper stage includes:
   a support part disposed on the second wall of the chamber;
   an extension part at least partially disposed inside the support part; and
   an adsorption part disposed at an end of the extension part in the first direction, and
   the method further comprises, after the peeling of the first to fourth sides of the film:
   adsorbing the object by the upper stage by moving the extension part in a second direction; and
   separating the film from the object by moving the extension part in the first direction.

10. The method of claim 9, wherein the separating of the object includes:
    tilting the upper stage to separate only a portion of the film from the object.

* * * * *